United States Patent
Nguyen et al.

(10) Patent No.: US 9,684,615 B1
(45) Date of Patent: Jun. 20, 2017

(54) APPARATUS AND METHODS FOR MULTIPLE-CHANNEL DIRECT MEMORY ACCESS

(71) Applicant: ALTERA CORPORATION, San Jose, CA (US)

(72) Inventors: Harry Nguyen, Campbell, CA (US); Philippe Molson, San Jose, CA (US); Michael Chen, San Jose, CA (US)

(73) Assignee: Altera Corporation, San Jose, CA (US)

( * ) Notice: Subject to any disclaimer, the term of this patent is extended or adjusted under 35 U.S.C. 154(b) by 296 days.

(21) Appl. No.: 14/592,385

(22) Filed: Jan. 8, 2015

(51) Int. Cl.
G06F 13/36 (2006.01)
G06F 13/28 (2006.01)
G06F 13/30 (2006.01)

(52) U.S. Cl.
CPC .................................. G06F 13/30 (2013.01)

(58) Field of Classification Search
None
See application file for complete search history.

(56) References Cited

U.S. PATENT DOCUMENTS

| | | | |
|---|---|---|---|
| 4,831,523 A | 5/1989 | Lewis et al. | |
| 5,056,010 A | 10/1991 | Huang | |
| 5,212,795 A | 5/1993 | Hendry | |
| 5,333,290 A | 7/1994 | Kato | |
| 5,588,112 A | 12/1996 | Dearth et al. | |
| 6,728,797 B2 | 4/2004 | Miura | |
| 6,775,716 B2* | 8/2004 | Tojima | G06F 13/30 710/22 |
| 6,792,481 B2 | 9/2004 | Hoang et al. | |
| 8,108,571 B1 | 1/2012 | Bouvier | |
| 8,176,221 B2 | 5/2012 | Nagai et al. | |
| 8,266,340 B2 | 9/2012 | Nagai et al. | |
| 8,619,731 B2* | 12/2013 | Montemurro | H04L 47/10 370/338 |
| 2002/0165897 A1* | 11/2002 | Kagan | H04L 49/90 718/102 |
| 2006/0161694 A1* | 7/2006 | Tomozaki | G06F 13/28 710/22 |
| 2007/0038791 A1* | 2/2007 | Subramanian | G06F 13/4022 710/116 |

(Continued)

OTHER PUBLICATIONS

Altera Corporation, DMA Controller Core, Nov. 2008, pp. 1-10, Quartus II Handbook Version 9.1, vol. 5: Embedded Peripherals.

*Primary Examiner* — David E Martinez
(74) *Attorney, Agent, or Firm* — Okamoto & Benedicto LLP (57) ABSTRACT

One embodiment relates to an integrated circuit for a multiple-channel direct memory access system. The integrated circuit includes multiple direct memory access (DMA) controllers, each one corresponding to a different DMA channel. A channelizer receives descriptors from the DMA controllers. Fragmentation circuits in the channelizer fragment descriptors to generate multiple sub-descriptors therefrom, and the sub-descriptors may be sorted into priority queues. Another embodiment relates to a method of providing DMA transfers for multiple DMA channels using an integrated circuit. Another embodiment relates to a system for multiple-channel direct memory access. Other embodiments and features are also disclosed.

18 Claims, 5 Drawing Sheets

(56) References Cited

U.S. PATENT DOCUMENTS

| | | | |
|---|---|---|---|
| 2008/0140877 A1* | 6/2008 | Baba | G06F 9/5011 |
| | | | 710/23 |
| 2008/0159140 A1* | 7/2008 | Robinson | H04L 12/2801 |
| | | | 370/232 |
| 2009/0070513 A1 | 3/2009 | Ganapathy et al. | |
| 2011/0307759 A1 | 12/2011 | Go et al. | |
| 2014/0126559 A1* | 5/2014 | Lynch | H04L 49/901 |
| | | | 370/338 |
| 2014/0344485 A1* | 11/2014 | Dondini | G06F 13/28 |
| | | | 710/22 |

* cited by examiner

APPARATUS AND METHODS FOR MULTIPLE-CHANNEL DIRECT MEMORY ACCESS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Technical Field

The present invention relates generally to integrated circuits and digital electronics. More particularly, the present invention relates to apparatus and methods for direct memory access.

Description of the Background Art

Digital electronics and computing systems often include a direct memory access (DMA) capability. DMA generally allows certain hardware subsystems to move data independently of a central processing unit (CPU).

SUMMARY

One embodiment relates to an integrated circuit for a multiple-channel direct memory access system. The integrated circuit includes multiple direct memory access (DMA) controllers, each one corresponding to a different DMA channel. A channelizer receives descriptors from the DMA controllers. Fragmentation circuits in the channelizer fragments descriptors to generate multiple sub-descriptors therefrom.

Another embodiment relates to a method of providing DMA transfers for multiple DMA channels using an integrated circuit. Descriptors are sent from multiple DMA controllers to a channelizer, each DMA controller being associated with a different DMA channel. The descriptors are fragmented by the channelizer into sub-descriptors, and the sub-descriptors are sorted by the channelizer into a plurality of queues based on a priority field.

Another embodiment relates to a system for multiple-channel direct memory access. A root complex includes a central processing unit, main memory, and a root port communicatively connected to the main memory and the central processing unit. A channelizer receives descriptors multiple DMA controllers. The channelizer fragments the descriptors to generate sub-descriptors and maps completed sub-descriptors onto the descriptors. A data mover receives and causes execution of the sub-descriptors via a data link that communicatively interconnects the data mover to the root complex.

Other embodiments and features are also disclosed herein.

DETAILED DESCRIPTION

A conventional DMA system has a fixed programming model architecture where registers used for the DMA sequential operation are tightly coupled with the main data path logic. This monolithic architecture offers poor scalability to efficiently address different models, such as a ring of descriptor lists, linked lists, descriptor fetcher locations, and descriptor format tables. Moreover, if multiple DMA channels were provided, the conventional DMA approach constrains the multi-channel feature to a given programming model, such as linked lists or linear arrays of descriptors.

The present disclosure overcomes these issues by disclosing a DMA system which efficiently provides multi-channel direct memory access for high-speed protocols. The multi-channel DMA system disclosed herein utilizes a modular DMA architecture to provide multi-channel support independent of (i.e. decoupled from) specific programming models.

Multi-Channel DMA System

Figure 1:
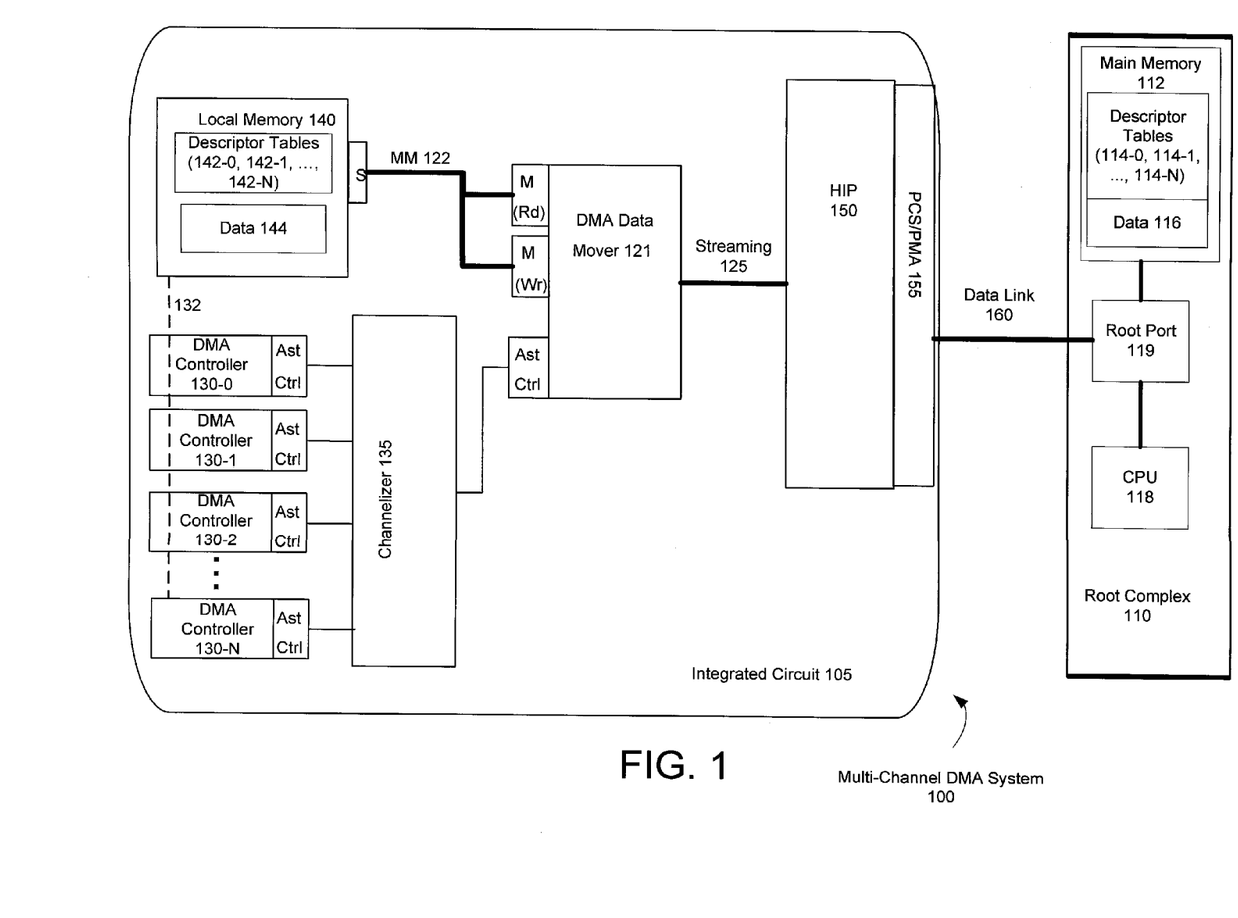
FIG. 1 is a diagram of a multi-channel direct memory access (DMA) system in accordance with an embodiment of the invention.

FIG. 1 is a diagram of a multi-channel DMA system in accordance with an embodiment of the invention. As depicted, the multi-channel DMA system 100 may include a root complex 110 communicatively connected by a data link 160 to an integrated circuit 105. The integrated circuit 105 may be manufactured on a single silicon die. In one implementation, the data link 160 may be a PCI Express® data link. Other types of data links may be used in other implementations.

The root complex 110 may include a root port 119, main memory 112 and a CPU 118. The root port 119 may connect to the data link 160 for communicating data with the integrated circuit 105. The CPU 118 and the main memory 112 also communicatively interconnect to the root port 119. The CPU 118 may execute instruction code and so process data. The main memory 112 may hold descriptor tables (114-0, 114-1, . . . , 114-N) and data 116. There may be N+1 descriptor tables 114-$n$, one for each DMA controller 130-$n$.

The integrated circuit 105 includes various modules used by the DMA system. As depicted, the modules on the integrated circuit 105 may include a hard-wired interface protocol (HIP) module 150, a DMA data mover module 121, and multiple DMA controllers (which may be referred to herein also as "channel descriptor controllers" or "channel controllers") (130-0, 130-2, 130-3, . . . , 130-N).

In one implementation, each of these DMA controllers (130-0, 130-2, 130-3, . . . , 130-N) may include a write channel controller circuit and a read channel controller circuit. The write channel controller circuit controls DMA write operations, and the read channel controller circuit controls DMA read operations.

In one implementation, the DMA data mover 121 may include a write data mover and a read data mover. The read data mover receives data obtained from a source address at the host to a destination address of the local memory, and the write data mover sends the data from a source address of the local memory to a destination address at the host. The read data mover and the write data mover may perform data transfers concurrently.

The integrated circuit 105 may also include local memory 140 and Physical Coding Sublayer and Physical Media Attachment (PCS/PMA) circuitry 155. The local memory 140 is on-chip memory and may hold copies of the descriptor tables (142-0, 142-1, . . . , 142-N) and data 144. The DMA data mover 121 may be connected to the local memory 140 by way of a memory-mapped (MM) write/read interface 122. In addition, in one implementation, each DMA controller (130-0, 130-2, 130-3, . . . , 130-N) may be connected to the local memory 140 by way of an interface 132.

Figure 2:
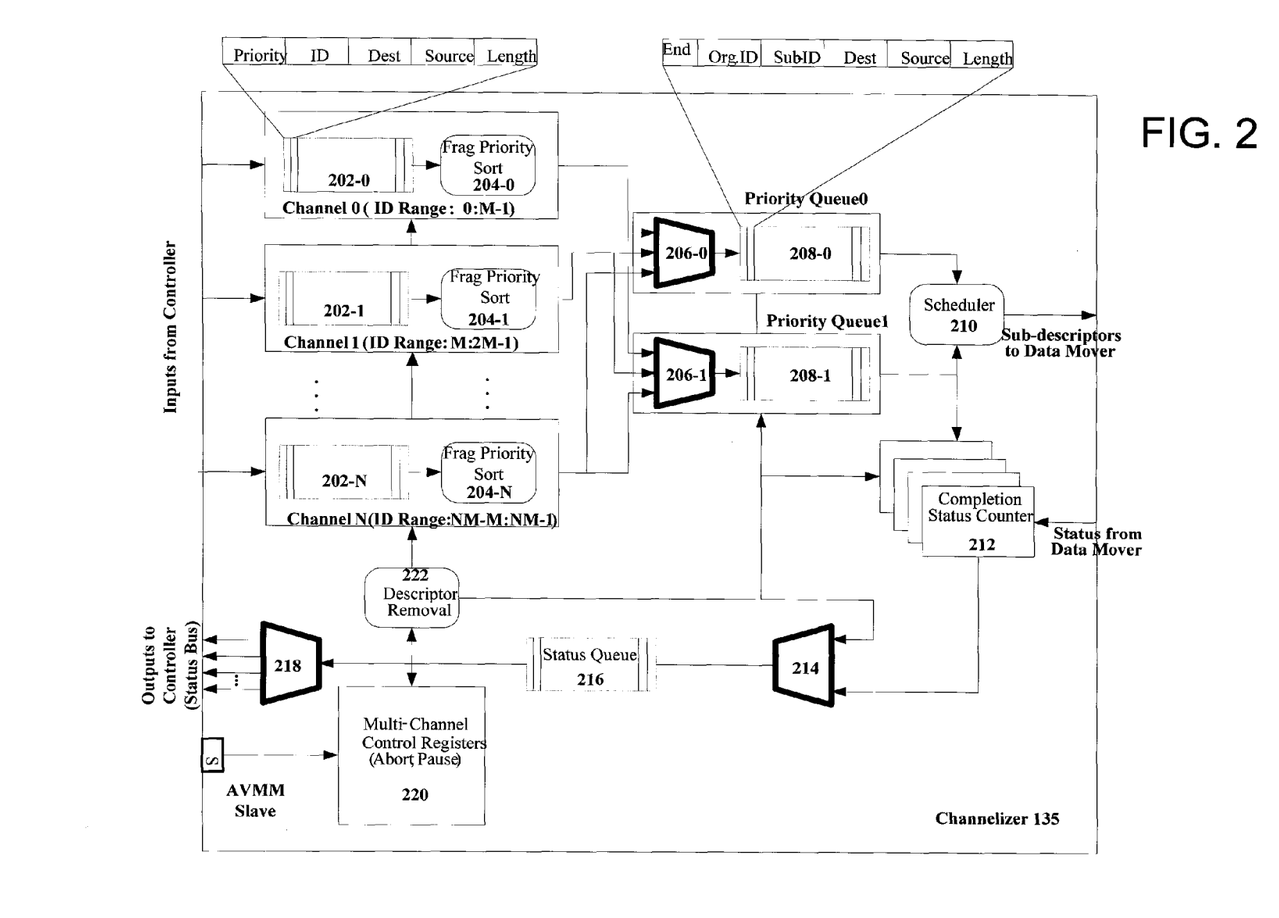
FIG. 2 depicts a channelizer circuit module in accordance with an embodiment of the invention.

FIG. 2 depicts a channelizer circuit module 135 in accordance with an embodiment of the invention. Also depicted in FIG. 2 are various modules within the channelizer circuit module 135.

The channelizer circuit module 135 may include a user controller interface (i.e., an input/output port) that connects to each of the DMA controllers (130-0, 130-1, 130-2, . . . , 130-N). In an exemplary implementation, N=3 such that there are N+1=4 channels. In other implementations, another number of channels may be implemented, such as 2 channels, 8 channels, or 16 channels, for example.

As indicated in FIG. 1, the user controller interface may be implemented, for example, using an Avalon®-ST (Ast) streaming interface available from Altera Corporation of San Jose, Calif. Other interface technologies may be utilized in other implementations. As shown in FIG. 2, inputs from the DMA controllers (130-0, 130-1, 130-2, . . . , 130-N) may be received by the N+1 channel queues (202-0, 202-1, 202-2, . . . , 202-N). Outputs to the DMA controllers may be sent via the output demultiplexer 218.

In an exemplary implementation, the input and output signaling from/to each channel controller may be implemented according to Table 1 below. In Table 1, the signals are divided into input/output signals for write channel controllers and input/output signals for read channel controllers.

TABLE 1

Exemplary User Controller Interface

| Interface | Signal Name | I/O | Description |
|---|---|---|---|
| Write Channel Controllers | AvWrDmaRxReady_o | Output | Write channel is ready to accept descriptor |
| | AvWrDmaRxValid_i | Input | Descriptor input valid. This signal is used to push a write descriptor into the internal descriptor queue |
| | AvWrDmaRxData_i[160:0] | Input | Write Descriptor or Data moving instruction. Additional bit added to indicate priority. (bit 160) |
| | AvWrDmaTxValid_o | Output | Write Descriptor Completion Status report |
| | AvWrDmaTxData_o[31:0] | Output | Write Descriptor ID being reported |
| Read Channel Controllers | AvRdDmaRxReady_o | Output | Read channel is ready to accept descriptor |
| | AvRdDmaRxValid_i | Input | Descriptor input valid. This signal is used to push a write descriptor into the internal descriptor queue |

TABLE 1-continued

Exemplary User Controller Interface

| Interface | Signal Name | I/O | Description |
|---|---|---|---|
| | AvRdDmaRxData_i[160:0] | Input | Read Descriptor or Data moving instruction. Additional bit added to indicate priority. (bit 160) |
| | AvRdDmaTxValid_o | Output | Read Descriptor Completion Status report |
| | AvRdDmaTxData_o[31:0] | Output | Read Descriptor ID being reported |

Each incoming (original) descriptor received from a channel controller may be stored in a first-in-first-out (FIFO) buffer (202-0, 202-1, 202-2, . . . , 202-N). The incoming descriptors are provided from each FIFO buffer to a corresponding fragmentation and priority sort circuit (204-0, 204-1, 204-2, . . . , 204-N).

As indicated in FIG. 2, the incoming descriptor may have the following fields: priority; descriptor identifier (ID); destination address; source address; and DMA length. In an exemplary implantation, the incoming descriptor may be implemented according to the descriptor bit mapping shown in Table 2 below.

TABLE 2

Exemplary Descriptor Bit Mapping

| Bits | Name | Description |
|---|---|---|
| [31:0] | Source Low Address | Lower 32-bit of PCIe address where the DMA will start to read. Address boundary must align to the 32-bit (2 LSB bits is 2'b00 |
| [63:32] | Source Hi Address | Higher 32-bit of PCIe Address where the DMA will start to read |
| [95:64] | Destination Low Address | Lower 32-bit of Avalon-MM address where the DMA will write. Address boundary must align to the 32-bit (2 LSB bits is 2'b00 |
| [127:96] | Destination Hi Address | Higher 32-bit of Avalon-MM address where the DMA will write |
| [145:128] | DMA Length | DMA Length in DWORDs (up to Max Desc. Size) |
| [153:146] | DMA Descriptor ID | Descriptor ID (0-255) |
| [159:154] | Reserved | |
| 160 | Priority | "0": Normal Priority "1": High Priority |

With multiple DMA channels, issues may arise due to channel starvation. In addition, load balancing may be desired. The multi-channel DMA system disclosed herein utilizes fragmentation to address these issues.

In accordance with an embodiment of the invention, the fragmentation and priority sort circuits (204-0, 204-1, 204-2, . . . , 204-N) fragment (partition) each descriptor into sub-descriptors. The payload size of the sub-descriptors may be a predetermined fixed size. In an exemplary implementation, the sub-descriptor payload size is 512 bytes, but other fixed sizes may be used in other implementations. In one embodiment, the end (last) sub-descriptor may have a payload size that may be less than the predetermined fixed size.

As indicated in FIG. 2, each sub-descriptor may have the following fields: an end bit; an original descriptor ID; a sub-descriptor ID; a destination address; a source address; and a DMA length. The original descriptor ID may be the descriptor ID of the descriptor from which the sub-descriptor was partitioned. In an exemplary implementation, (N+1)M sub-descriptor IDs [0:(N+1)M−1] may be used, where N+1 is the number of channels, and M is a maximum number of sub-descriptors that may be partitioned from a descriptor. As shown, Channel 0 may be assigned to use sub-descriptor IDs 0:M−1, Channel 1 may be assigned to use sub-descriptor IDs M:2M−1, Channel 2 may be assigned to use sub-descriptor IDs 2M:3M−1, . . . , and Channel N may be assigned to use sub-descriptor IDs NM:N+1)M−1.

In one specific implementation, for example, N+1=4 and M=8. In this case, Channel 0 may be assigned to use sub-descriptor IDs 0:7, Channel 1 may be assigned to use sub-descriptor IDs 8:15, Channel 2 may be assigned to use sub-descriptor IDs 16:23, and Channel 3 may be assigned to use sub-descriptor IDs 24:31.

The sub-descriptors may be provided by the fragmentation and priority sort circuits (204-0, 204-1, 204-2, . . . , 204-N) to the appropriate priority queue based on a priority bit (or bits) provided in the original descriptor. In the case where one priority bit is used, two degrees of priority are encoded, so two priority queues are used. If two priority bits are used, then four degrees of priority are encoded, so four priority queues would be used.

In the illustrated implementation, there is one priority bit, so the sub-descriptors are sorted into two priority queues. If the priority bit of the original descriptor is zero, then all sub-descriptors from that descriptor are provided to the sub-descriptor multiplexer 206-0 for the Priority Queue0 208-0. On the other hand, if the priority bit of the original descriptor is one, then all sub-descriptors from that descriptor are provided to the sub-descriptor multiplexer 206-1 for the Priority Queue1 208-1. Hence, the sub-descriptors for each channel are sorted into the priority queues before scheduling for execution.

The scheduler 210 selects the sub-descriptors from the priority queues for execution and provides the selected sub-descriptors to the DMA data mover 121. From the point of view of the DMA data mover 121, the sub-descriptors from the scheduler 210 are basically descriptors with limited payload size. Hence, the description herein may describe the sub-descriptors provided by the scheduler 210 to the DMA data mover 121 as descriptors.

In one implementation, the interface to the DMA data mover 121 may be implemented using an Avalon®-ST (Ast) streaming interface available from Altera Corporation of San Jose, Calif. Other interface technologies may be utilized in other implementations. In an exemplary implementation, the data mover interface may be implemented according to Table 3 below.

TABLE 3

Exemplary Data Mover Interface

| Interface | Signal Name | I/O | Description |
|---|---|---|---|
| Write Data Mover AST | AvWrDmaRxReady_i | Input | Write Data Mover ready to accept descriptor |
| | AvWrDmaRxValid_o | Output | Descriptor output valid. This signal is used to push a write descriptor into the data mover. |
| | AvWrDmaRxData_o[167:0] | Output | Write Descriptor or data moving instruction to the data mover. The 8 LSB bit carry function number, if enabled. |

TABLE 3-continued

Exemplary Data Mover Interface

| Interface | Signal Name | I/O | Description |
|---|---|---|---|
| | AvRdDmaTxValid_i | Input | Read Descriptor Completion Status report from data mover |
| | AvRdDmaTxData_i[31:0] | Input | Read Descriptor ID being reported |
| Read Data Mover AST | AvRdDmaRxReady_i | Input | Read Data Mover ready to accept descriptor |
| | AvRdDmaRxValid_o | Output | Descriptor output valid. This signal is used to push a write descriptor into the data mover. |
| | AvRdDmaRxData_o[167:0] | Output | Read Descriptor or data moving instruction to the data mover. The 8 LSB bit carry function number, if enabled. |
| | AvRdDmaTxValid_i | Input | Read Descriptor Completion Status report from data mover |
| | AvRdDmaTxData_i[31:0] | Input | Read Descriptor ID being reported |

In an exemplary implementation, the scheduler 210 may utilize a round-robin type of arbitration, where the frequency of transmission between the two priority queues is based on a transmit priority weight parameter. In the case where the Priority Queue1 has a higher priority than Priority Queue0, then Priority Queue1 would have a higher transmit priority weight such that sub-descriptors are selected more frequently from Priority Queue1 than from Priority Queue0. This exemplary implementation advantageously provides for greater transmission frequency for the higher priority sub-descriptors while avoiding channel starvation for the lower priority sub-descriptors.

Completion of execution of the sub-descriptors may be received by the channelizer 135 from the DMA data mover 121. Completion status counters 212 may be used to keep track of the completion status of the original descriptor IDs.

As shown in FIG. 2, a status multiplexer 214 may receive status data from the completion status counters 212 and also from the descriptor removal circuit 222. The status data may be provided from the status multiplexer 214 to a status queue 216 which buffers the completion status before it is forwarded to the DMA controllers. A status demultiplexer 218 may output the status data to a status bus which is accessed by the individual DMA controllers. In an exemplary implementation, the status bus bit mapping may be implemented according to Table 4 below.

TABLE 4

Exemplary Status Bus Bit Mapping

| Bits | Name | Description |
|---|---|---|
| [7:0] | Descriptor ID | Descriptor ID being reported. |
| [11:8] | Reserved | |
| [13:12] | Status Code | 2'b00: DMA completed successfully<br>2'b01: Descriptor removal completed successfully<br>2'b10: Descriptor partially removed<br>2'b11: Descriptor removal failed |
| [31:14] | Reserved | |

In accordance with an embodiment of the invention, multi-channel control registers 220 of the channelizer 135 may receive control signals from the DMA controllers (130-0, 130-1, . . . , 130-N). The control signals may include an abort command, a pause command, and other control signals. In one implementation, the control signals may be received via a memory-mapped (for example, an AVMM) slave port. In an exemplary implementation, the slave interface may be implemented according to Table 5 below.

TABLE 5

Exemplary Slave Interface

| Interface | Signal Name | I/O | Description |
| --- | --- | --- | --- |
| Write MC AVMM Slave | WrMcsWrite_i | Input | Write Multi-Channel Write Request. Send request to purge a pending descriptor. |
| | WrMcsAddress_i | Input | Write Multi-Channel Address |
| | WrMcsData_i[31:0] | Input | Write Multi-Channel Data input |
| | WrMcsWaitRequest_o | Output | Write Multi-Channel Wait Request |
| Write MC AVMM Slave | RdMcsWrite_i | Input | Read Multi-Channel Write Request |
| | RdMcsAddress_i | Input | Read Multi-Channel Address |
| | RdMcsData_i[31:0] | Input | Read Multi-Channel Data input. This indicate the ID of the descriptor being aborted |
| | RdMcsWaitRequest_o | Output | Read Multi-Channel Wait Request |

In accordance with an embodiment of the invention, to cancel a pending DMA operation, a DMA controller 130-*n* may write the descriptor ID that it wants to cancel (delete) into one of the multi-channel control registers 220. descriptor removal circuit module 222 may sample the multi-channel control registers 220.

The descriptor removal circuit module 222, upon detecting a write transaction to the register, stops all the pertinent state machines, searches the channel queues (202-0, 202-1, . . . , 202-N) and the priority queues (208-0 and 208-1), and removes all descriptors or sub-descriptors with a matched descriptor ID. There are a few possible cases depending on the descriptor processing stage.

In a first case, a matched descriptor ID is found that has not been processed. In this case, the descriptor is removed from the channel queue and a "successful removal" status message may be reported.

In a second case, a matched descriptor ID is found that is partially processed in that a fragment of the original descriptor has been sent. In this case, all sub-descriptors may be removed from the priority queues and a "successful removal" status message may be reported. Partial completion data may arrive subsequently.

In a third case, no matched descriptor ID is found. In this case, an "unsuccessful removal" status message may be reported. Completion data may arrive subsequently.

Multi-Channel DMA Operation

Figure 3:
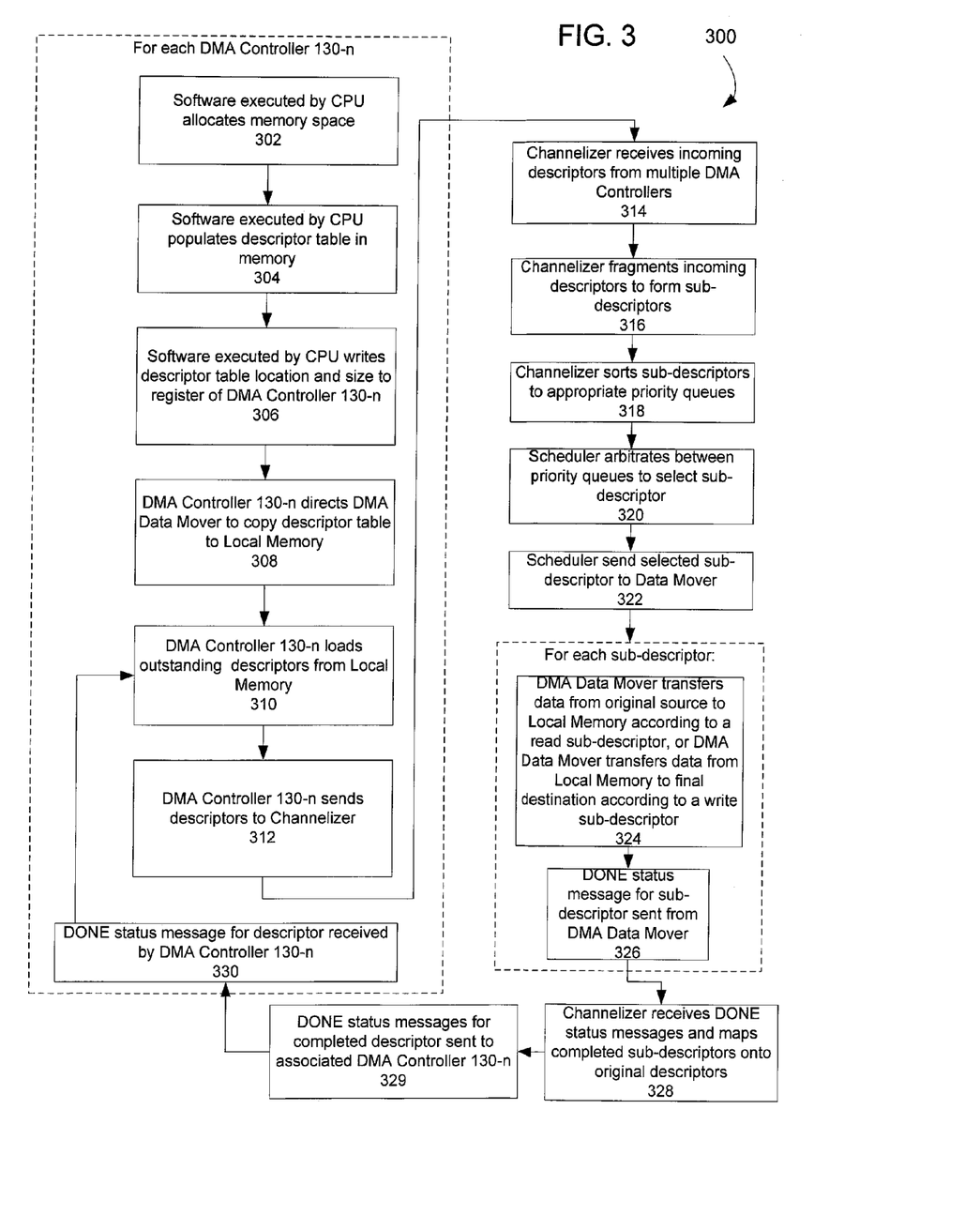
FIG. 3 is a flow chart depicting a method of performing DMA operations from multiple channels in accordance with an embodiment of the invention.

FIG. 3 is a flow chart depicting a method of performing DMA operations from multiple channels in accordance with an embodiment of the invention. A DMA operation may be used to transfer data from a source address range to a destination address range.

Steps Performed by Each DMA Controller

In accordance with an embodiment of the invention, each channel #n has a corresponding DMA controller 130-*n*. For each DMA controller 130-*n* (n=0, 1, 2, . . . , N), steps 302 through 312 and step 330 may be performed.

Per step 302, a DMA operation may begin when software executed by the CPU 118 of the root complex 110 allocates memory space in the main memory 112. Per step 304, the software executed by the CPU 118 may populate a descriptor table 114-*n* within the allocated memory. The descriptor table 114-*n* may include one or more descriptor entries ("descriptors" or "DMA descriptors").

Per step 306, the software executed by the CPU 118 writes the location and size of the descriptor table 114-*n* to a register of the descriptor controller 130-*n*. Per step 308, the descriptor controller 130-*n* uses this information to direct the DMA data mover 121 to copy the descriptor table 114-*n* to the local memory 140 (forming copied descriptor table 142-*n*).

Per step 310, with the copied descriptor table 142-*n* in the local memory 140, the descriptor controller 130-*n* loads one or more outstanding (i.e. not yet completed) DMA descriptors from the copied descriptor table 142-*n*.

Per step 312, to request DMA operations, the DMA controller 130-*n* sends descriptors to the channelizer 135. The following information may be included in a descriptor: (i) the length in data words within an allowable maximum size (such as 4 kilobytes or 8 kilobytes, for example); (ii) the source DMA address; (iii) the destination DMA address; (iv) the descriptor identifier (ID), where each channel uses descriptor IDs in an assigned range; and (v) a priority field (such as a priority bit, for example).

In accordance with an embodiment of the invention, the number of descriptor IDs assigned per channel depends on a total number of DMA channels being supported. For example, if two DMA channels are supported, then each channel may be assigned 16 descriptor IDs. If four DMA channels are supported, then each channel may be assigned 8 descriptor IDs. If eight DMA channels are being supported, then each channel may be assigned 4 descriptor IDs.

The descriptors may include read and/or write descriptors. The read descriptors may each contain an original source address from a loaded descriptor and an end-point (EP) destination address in local memory. The write descriptors may each contain an EP source address in local memory and a final destination address from a loaded descriptor.

Per step 330, after completion of the operations specified by a descriptor, a DONE status message for the descriptor may be received by the appropriate DMA controller 130-*n* from the channelizer 135. Thereafter, the method 300 may loop back to block 310 and load one or more further outstanding descriptors, if any, from the local memory 140 to the DMA controller 130-*n*.

Steps Performed by the Channelizer

Per block 314, the channelizer 135 receives incoming descriptors from each of the multiple DMA controllers (130-0, 130-1, 130-2, . . . , 130-N). These descriptors may be received by the corresponding channel queues (202-0, 202-1, 202-2, . . . , 202-N).

Per block 316, the fragmentation and priority sort circuits (204-0, 204-1, 204-2, . . . , 204-N) in the channelizer 135 may fragment the incoming descriptors from the corresponding channels to form sub-descriptors. As discussed above, the payload of the sub-descriptors may be of a predetermined fixed size (such as 512 bytes, in one implementation).

Per block 318, the sub-descriptors may be sorted by the fragmentation and priority sort circuits (204-0, 204-1, 204-2, . . . , 204-N) to appropriate priority queues. As discussed above, the sorting may be based on one or more priority bits to two or more priority queues.

Per block 320, the scheduler 210 of the channelizer 135 arbitrates between priority queues to select a sub-descriptor for execution. Per block 322, the scheduler 210 sends the selected sub-descriptor to the DMA data mover 121.

Per block 328, the channelizer 135 receives sub-descriptor DONE status messages from the DMA data mover 121 and maps completed sub-descriptors onto the original (unfragmented) descriptors. Per block 329, when all the sub-descriptors fragmented from an original descriptor has been completed, then a descriptor DONE status message may be sent to the DMA controller 130-n that originated the descriptor.

Steps Performed by DMA Data Mover for Each Sub-Descriptor

Per block 324, for each sub-descriptor, the DMA data mover 121 causes a data transfer. If the sub-descriptor specifies a memory read operation (i.e. is a read sub-descriptor), then the DMA data mover 121 transfers data from the host memory 112 to local memory 140. On the other hand, if the sub-descriptor specifies a memory write operation (i.e. is a write sub-descriptor), then the DMA data mover 121 transfers data from the local memory 140 to the host memory 112.

Per block 326, after the data transfer for a sub-descriptor is successfully completed, a DONE status message for the sub-descriptor may be sent from the DMA data mover 121 to the channelizer 135.

Example FPGA

Figure 4:
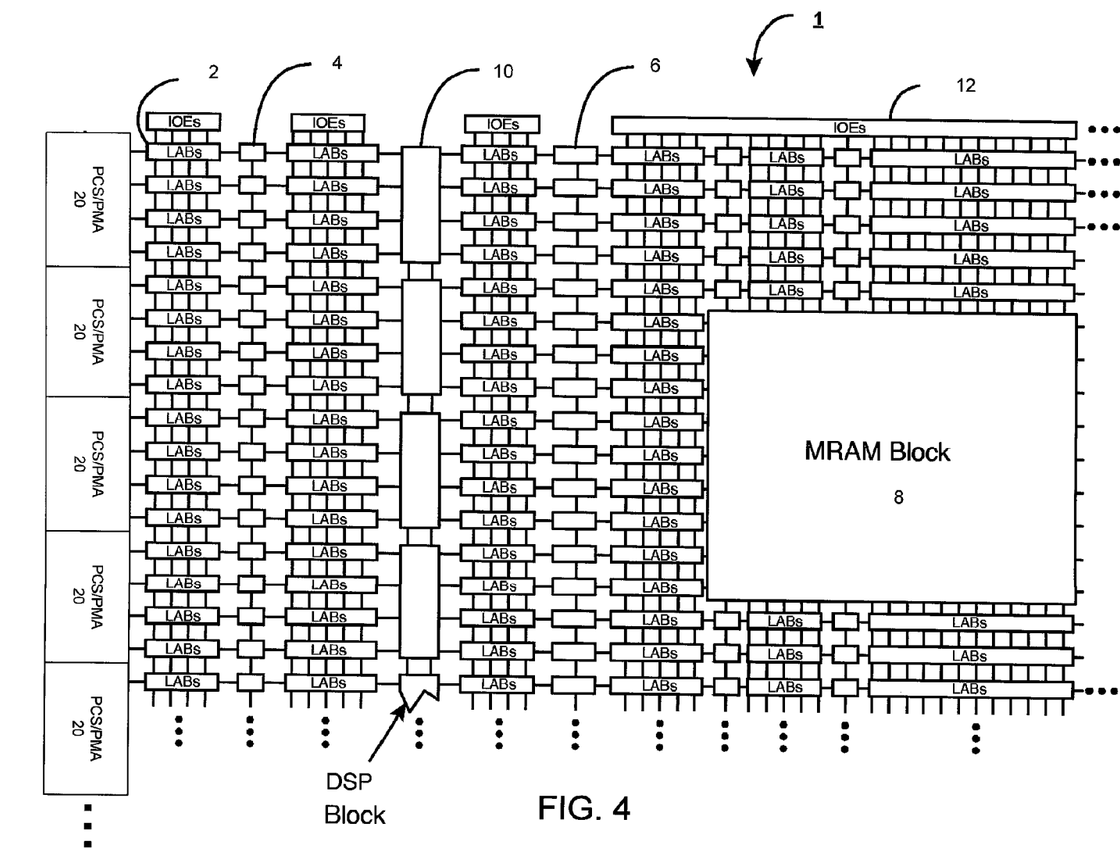
FIG. 4 is a simplified partial block diagram of a field programmable gate array (FPGA) that can include aspects of the present invention.

FIG. 4 is a simplified partial block diagram of a field programmable gate array (FPGA) 1 that can include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 1 includes within its "core" a two-dimensional array of programmable logic array blocks (or LABs) 2 that are interconnected by a network of column and row interconnect conductors of varying length and speed. LABs 2 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 1 may also include a distributed memory structure including random access memory (RAM) blocks of varying sizes provided throughout the array. The RAM blocks include, for example, blocks 4, blocks 6, and block 8. These memory blocks can also include shift registers and FIFO buffers.

FPGA 1 may further include digital signal processing (DSP) blocks that can implement, for example, multipliers with add or subtract features. Input/output elements (IOEs) 12 located, in this example, around the periphery of the chip support numerous single-ended and differential input/output standards. Each IOE 12 is coupled to an external terminal (i.e., a pin) of FPGA 10. PMA/PCS channel circuits 20 may also be provided with each PMA/PCS channel circuit 20 being coupled to several LABs.

In one embodiment, the integrated circuit 105 for the multi-channel DMA system 100 may be an FPGA. For example, the DMA data mover 121, channelizer 135 and the HIP module 150 may be implemented as a hard-wired modules, and the DMA controllers (130-1, 130-2, 130-3, . . . , 130-N) may be implemented in the programmable logic fabric of the FPGA. The local memory 140 may be implemented in the memory blocks on the FPGA.

It is to be understood that FPGA 1 is described herein for illustrative purposes only and that the present invention can be implemented in many different types of PLDs, FPGAs, and ASICs.

Example Digital System

Figure 5:
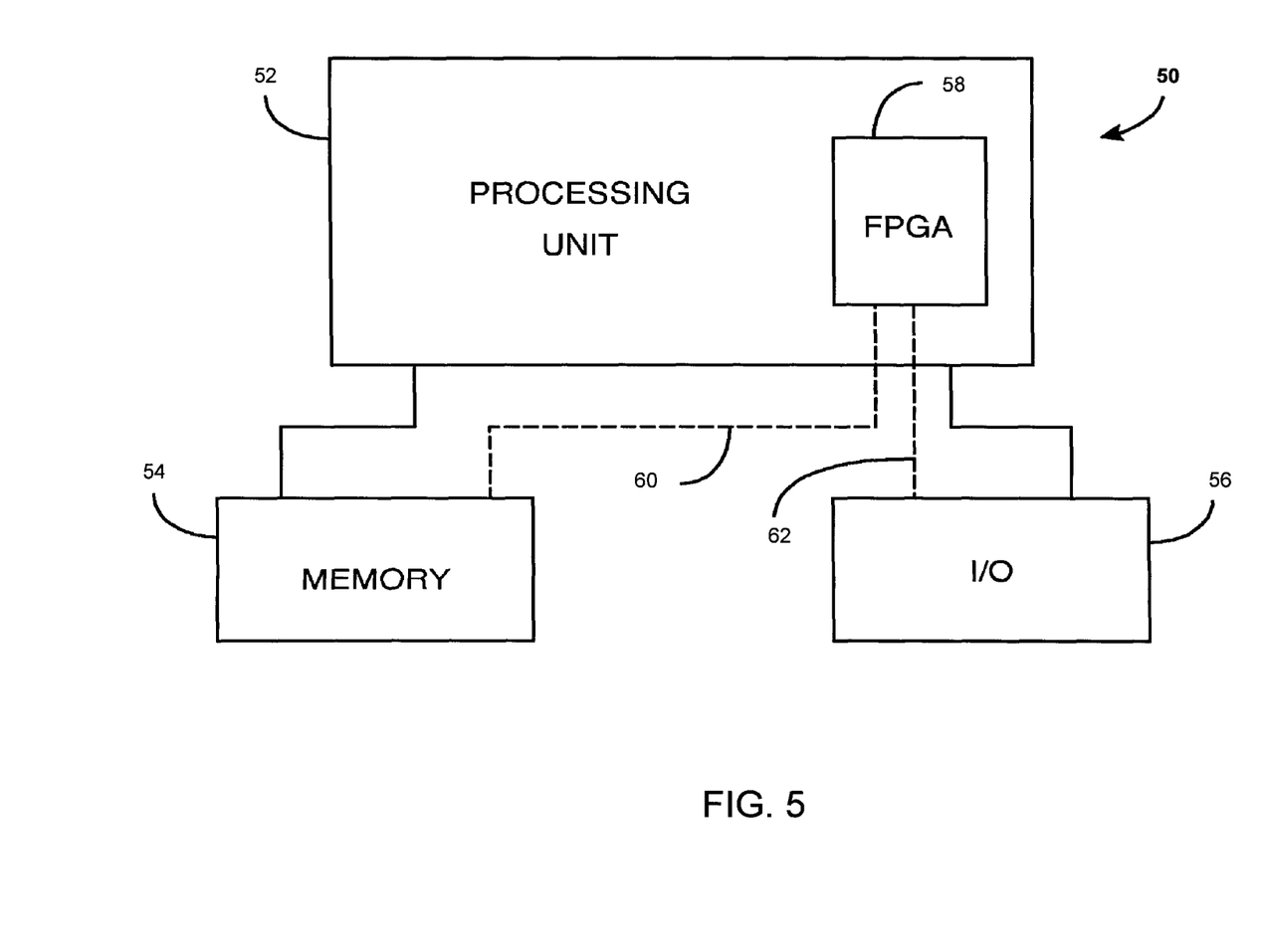
FIG. 5 is a block diagram of an exemplary digital system that can employ techniques of the present invention.

FIG. 5 shows a block diagram of an exemplary digital system 50 that can embody techniques of the present invention. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

Benefits and Advantages

In accordance with an embodiment of the invention, the modular architecture in which the channelizer operates between the DMA data mover and the multiple DMA controllers has the benefit of scalability to different numbers of DMA controllers (i.e. to different numbers of DMA channels). Furthermore, the channelizer's operation being independent from the DMA controllers provides for load balancing and scheduling may be applied across the multiple DMA channels, even if they have different programming models.

This architecture offers an efficient implementation when hardening the DMA system while maintaining programming flexibility. In particular, the channelizer and the DMA data mover may be implemented in hard-wired circuitry, while the descriptor controller may be implemented in programmable circuitry.

In addition, there is a usability benefit due to this architecture. Users may customize each DMA channel by changing the DMA controller without needing to know details of the protocol being used by the data link. This is because, while the data mover may be optimized for the data link protocol, each DMA controller is protocol agnostic.

Furthermore, this architecture also has a testability benefit. The modularity of the architecture enables directed testing at the data mover level. Such directed testing at the data mover level may not be readily achieved in a conventional architecture.

Conclusion

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. An integrated circuit for a multiple-channel direct memory access system, the integrated circuit comprising:
   a plurality of direct memory access (DMA) controllers, each one of the plurality of DMA controller corresponding to a different DMA channel;
   a channelizer coupled to, and receiving descriptors from, the plurality of DMA controllers;
   a plurality of fragmentation circuits in the channelizer, each one of the plurality of fragmentation circuits fragmenting a descriptor from a corresponding DMA controller to generate a plurality of sub-descriptors;
   a plurality of priority sort circuits in the channelizer, each one of the plurality of priority sort circuits sorting sub-descriptors from a corresponding fragmentation circuit according to a priority field in the sub-descriptors;
   a plurality of priority queues in the channelizer receiving sub-descriptors from the plurality of priority sort circuits, each one of the plurality of priority queues receiving sub-descriptors having an associated value in the priority field;
   a scheduler that selects sub-descriptors for transmission from the plurality of priority queues;
   a DMA data mover for receiving sub-descriptors from the scheduler and executing the sub-descriptors by causing transfers of data; and
   circuitry comprising completion status counters for receiving done status messages indicating successful execution of the sub-descriptors, mapping completed sub-descriptors onto the descriptors, and sending done status messages indicating successful execution of the descriptors to the DMA controllers.

2. The integrated circuit of claim 1, wherein the priority field comprises a priority bit, and wherein the plurality of priority queues comprises two priority queues.

3. The integrated circuit of claim 1, wherein the scheduler uses round-robin arbitration where a frequency of transmission from a priority queue depends on a transmit priority weight parameter.

4. The integrated circuit of claim 1, wherein the DMA data mover comprises a write data mover and a read data mover.

5. The integrated circuit of claim 4, wherein the read data mover receives data obtained from a source address, and the write data mover sends the data to a destination address.

6. The integrated circuit of claim 1, further comprising:
   a status bus for transmitting the done status messages indicating successful execution of the descriptors from the channelizer to the plurality of DMA controllers.

7. The integrated circuit of claim 1, further comprising:
   a plurality of channel queues in the channelizer for buffering descriptors received from the plurality of DMA controllers.

8. The integrated circuit of claim 7, further comprising:
   multi-channel control registers for receiving commands from the plurality of DMA controllers; and
   a descriptor removal circuit for sampling the multi-channel control registers to determine that a descriptor is to be removed from the plurality of channel queues.

9. The integrated circuit of claim 1, wherein the DMA data mover and the channelizer are implemented in hard-wired circuitry, and wherein the DMA controllers are implemented in electronically-programmed circuitry.

10. A method of providing a direct memory access (DMA) transfers for multiple DMA channels using an integrated circuit, the method comprising:
    sending descriptors from a plurality of DMA controllers to a channelizer, each one of the plurality of DMA controllers being associated with a different DMA channel;
    fragmenting the descriptors by the channelizer into sub-descriptors; and
    sorting the sub-descriptors by the channelizer into a plurality of queues based on a priority field;
    using an arbitration procedure by the channelizer to select sub-descriptors for transmission from the plurality of priority queues;
    sending selected sub-descriptors from the channelizer to a DMA data mover;
    receiving sub-descriptors by the DMA data mover and executing the sub-descriptors by causing movement of data; and
    receiving done status messages indicating successful execution of the sub-descriptors, mapping completed sub-descriptors onto the descriptors, and sending done status messages indicating successful execution of the descriptors to the plurality of DMA controllers.

11. The method of claim 10, wherein the arbitration procedure comprises a round-robin procedure where a frequency of transmission from a priority queue depends on a transmit priority weight parameter.

12. A system for multiple-channel direct memory access (DMA), the system comprising:

a root complex comprising a central processing unit, main memory, and a root port communicatively connected to the main memory and the central processing unit;

a plurality of DMA controllers, each one of the plurality of DMA controller corresponding to a different DMA channel;

a channelizer coupled to, and receiving descriptors from, the plurality of DMA controllers, wherein the channelizer fragments the descriptors to generate sub-descriptors and maps completed sub-descriptors onto the descriptors;

a plurality of priority sort circuits in the channelizer, each one of the plurality of priority sort circuits sorting sub-descriptors according to a priority field in the sub-descriptors;

a plurality of priority queues in the channelizer receiving sub-descriptors from the plurality of priority sort circuits, each one of the plurality of priority queues receiving sub-descriptors having an associated value in the priority field;

a scheduler that selects sub-descriptors for transmission from the plurality of priority queues;

a data mover for receiving and causing execution of the sub-descriptors;

circuitry comprising completion status counters for receiving done status messages indicating successful execution of the sub-descriptors, mapping completed sub-descriptors onto the descriptors, and sending done status messages indicating successful execution of the descriptors to the DMA controllers; and a data link communicatively interconnecting the root complex and the data mover.

13. The system of claim 12, wherein the priority field comprises a priority bit, and wherein the plurality of priority queues comprises two priority queues.

14. The system of claim 12, wherein the scheduler uses round-robin arbitration where a frequency of transmission from a priority queue depends on a transmit priority weight parameter.

15. The system of claim 12, wherein the data mover comprises a write data mover and a read data mover.

16. The system of claim 15, wherein the read data mover receives data obtained from a source address, and the write data mover sends the data to a destination address.

17. The system of claim 12, further comprising:

a status bus for transmitting the done status messages indicating successful execution of the descriptors from the channelizer to the plurality of DMA controllers.

18. The system of claim 12, further comprising:

a plurality of channel queues in the channelizer for buffering descriptors received from the plurality of DMA controllers.

* * * * *